United States Patent [19]

Nelson et al.

[11] 4,038,658

[45] July 26, 1977

[54] MOVING TARGET SPEED AND DIRECTION DETERMINING RADAR SYSTEM

[75] Inventors: John L. Nelson; Douglas G. Trego, both of Phoenix, Ariz.

[73] Assignee: Motorola, Inc., Franklin Park, Ill.

[21] Appl. No.: 314,881

[22] Filed: Dec. 13, 1972

[51] Int. Cl.² .............................................. G01S 9/42
[52] U.S. Cl. ........................................ 343/7.7; 343/9
[58] Field of Search .............. 343/8, 9, 11 VB, 5 CM, 343/7.7

[56] References Cited

U.S. PATENT DOCUMENTS

| | | | |
|---|---|---|---|
| 2,442,765 | 6/1948 | Franklin | 343/8 |
| 2,703,880 | 3/1955 | Longacre | 343/11 VB |
| 2,967,449 | 1/1961 | Weiss | 343/8 |
| 3,066,279 | 11/1962 | Marks | 343/8 |
| 3,314,065 | 4/1967 | Steigerwalt et al. | 343/8 |
| 3,406,395 | 10/1968 | Zupanick | 343/8 |
| 3,833,906 | 9/1974 | Augustine | 343/8 |
| 3,848,253 | 11/1974 | Genuist et al. | 343/7.7 |

*Primary Examiner*—T.H. Tubbesing
*Attorney, Agent, or Firm*—M. David Shapiro

[57] ABSTRACT

A radar is mounted on an airplane with a pair of antennas affixed to the airplane and directed to one side thereof for providing a relatively narrow radar beam squinted approximately 20° ahead of a line transverse to the direction of motion and approximately 20° behind the line, respectively. The radar is constructed to alternately energize the antennas and a visual display system provides individually identifiable visual indications of targets interrupting the beams. The amount a target moves on the visual display between the interruptions of the forward and rearward directed beams provides a direct indication of the direction and speed of the target.

6 Claims, 3 Drawing Figures

MOVING TARGET SPEED AND DIRECTION DETERMINING RADAR SYSTEM

BACKGROUND OF THE INVENTION

1. Field of the Invention

The present invention pertains to side looking radars for use on vehicles, such as airplanes and the like, to observe moving targets and determine the speed and direction of movement thereof. It has long been a desire of various organizations, such as military, to be able to determine the direction and speed of moving targets from an airplane or other vehicle with a side looking radar.

2. Prior Art

Previous attempts at determining the speed and direction of moving targets by using side looking radars have incorporated such unwieldly apparatus and methods as two aircraft, one behind the other, each having a side looking radar. Another method is the use of a single aircraft with a side looking radar flying a predetermined course, such as a racetrack type course. Because of time lag, differences in equipment and many other variables these methods have not been able to provide a useful and accurate determination of target speed and direction. Other types of radar and methods, such as measuring a Doppler effect, have been attempted but inaccuracies and interferences render these systems relatively useless for accurate determination of speed and direction of moving targets.

SUMMARY OF THE INVENTION

The present invention pertains to a moving target speed and direction determining radar system including side looking radar means mounted on a vehicle and having a pair of antennas directed generally forward with respect to a line transverse to the movement of the vehicle and generally rearward of the line, respectively, with means for providing individually identifiable visual indications of moving targets interrupting radar beams from said antennas so that a comparison of the visual indications provides a direct indication of speed and direction of the target.

It is an object of the present invention to provide an improved moving target speed and direction determining radar system.

It is a further object of the present invention to provide side looking radar on a vehicle, such as aircraft and the like, having the capability of providing indications of speed and direction of targets.

These and other objects of this invention will become apparent to those skilled in the art upon consideration of the accompanying specifications, claims and drawings.

BRIEF DESCRIPTION OF THE DRAWINGS

Referring to the drawings, wherein like characters indicate like parts throughout the Figures.

DESCRIPTION OF THE PREFERRED EMBODIMENT

Figure 1:
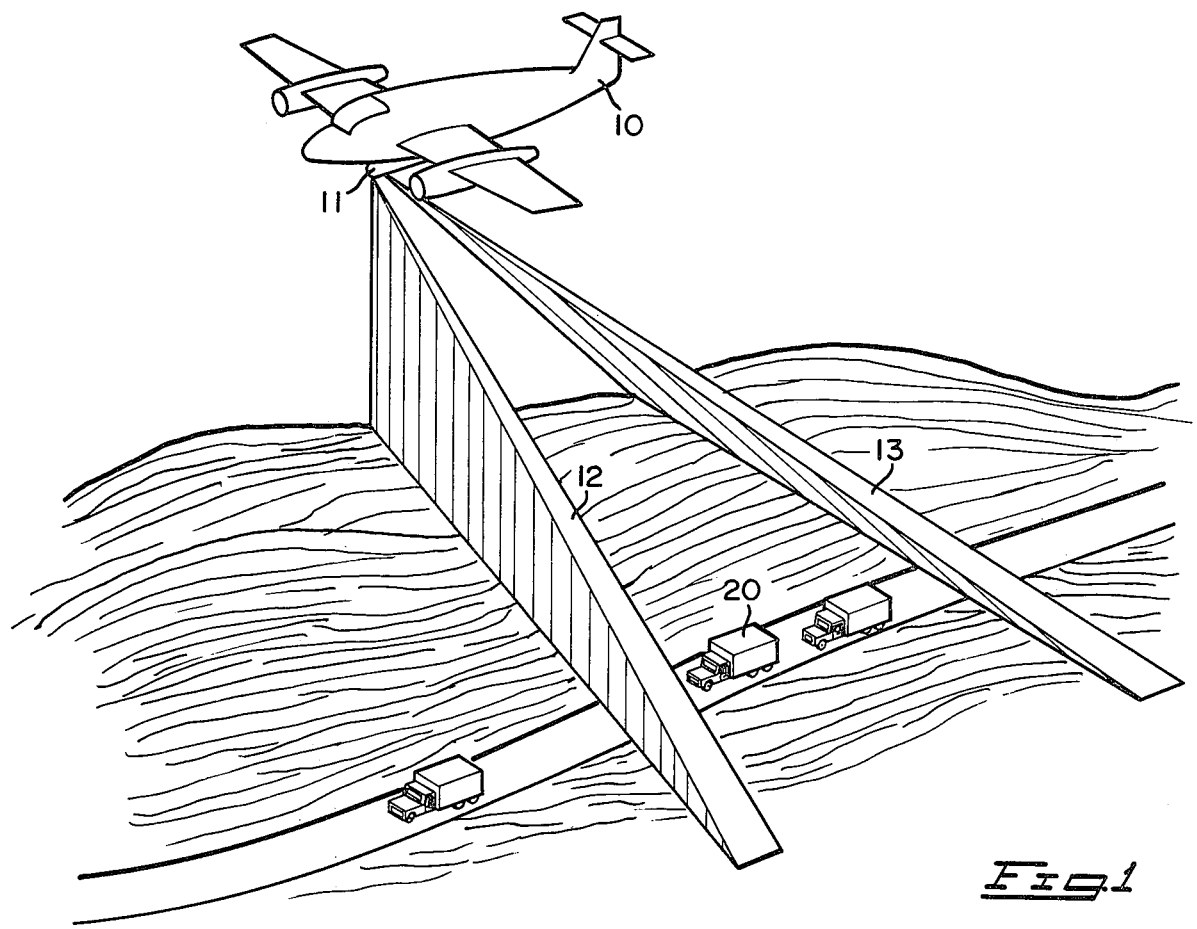
FIG. 1 is a view in perspective of an aircraft having the present radar system mounted thereon and illustrating the beam pattern of the system.

Referring to the Figures, the numeral 10 designates a vehicle, in this embodiment an airplane, having a moving target speed and direction determining radar system mounted thereon. The radar system includes antenna means generally designated 11 for providing a pair of radar beams 12 and 13 directed outwardly, transverse to the direction of movement of the vehicle 10. Each beam 12 and 13 is generally fan shaped, i.e., the width of the beam becomes progressively larger as it extends outwardly from the airplane 10, and the two beams 12 and 13 are spaced apart and diverge as they extend outwardly from the airplane 10. The radar beam 12 is squinted, or directed, ahead of a line perpendicular to the direction of movement of the vehicle 10 a fixed angular amount, in this embodiment approximately 20°. The radar beam 13 is squinted, or directed, to the rear of the perpendicular line a fixed angular amount, in this embodiment also 20°. As will become apparent presently, it is necessary to have the radar beams 12 and 13 directed to the side of the vehicle 10 at a known angle relative to the perpendicular line so that this angle can be utilized for subsequent calculations.

Figure 3:
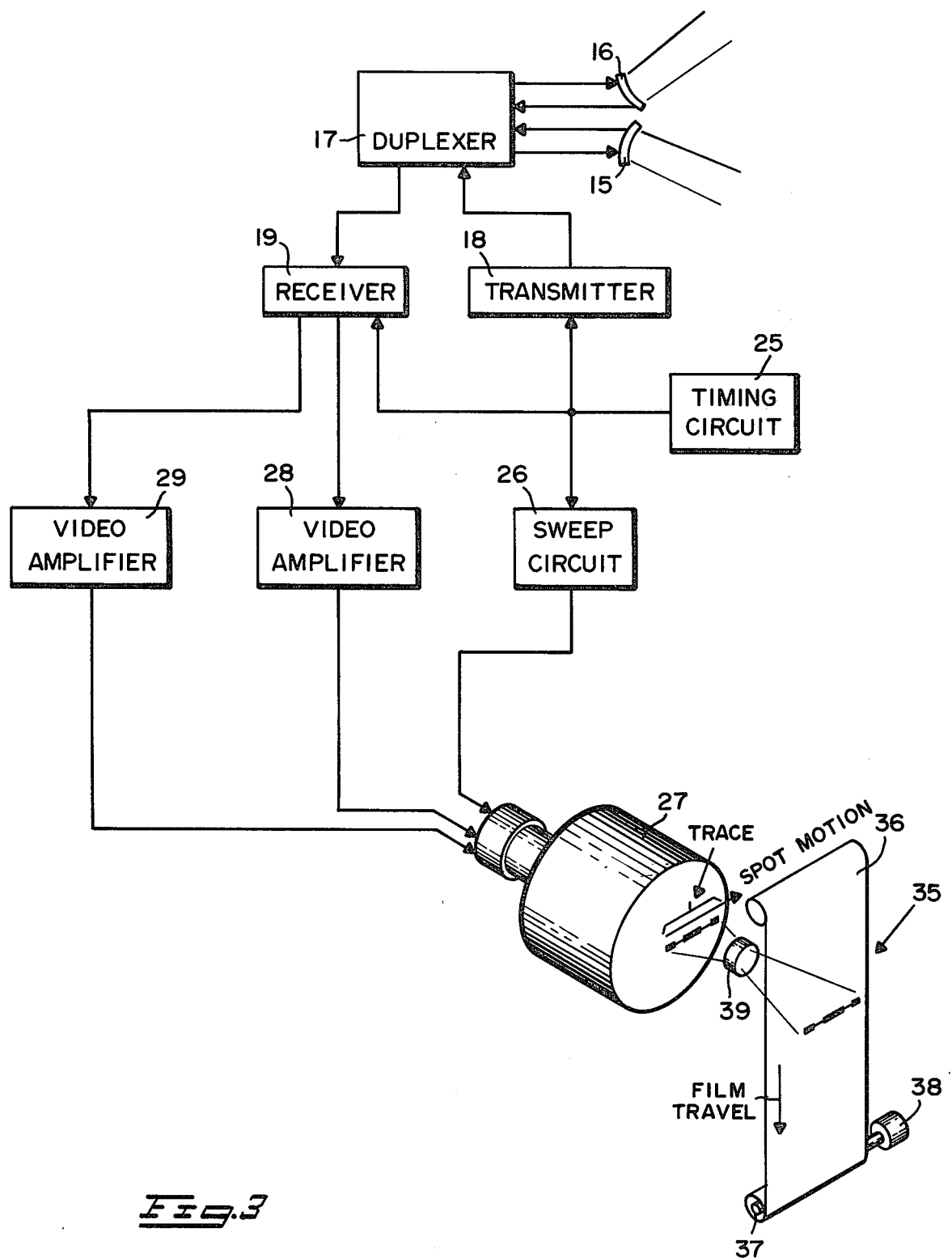
FIG. 3 is a block diagram of the radar system.

Referring more specifically to FIG. 3, the antenna means 11 includes a first antenna 15 and a second antenna 16 which, upon being energized, produce the radar beams 12 and 13, respectively. The antennas 15 and 16 are connected to a duplexer 17 by some convenient means, such as wave guides, coaxial cable, etc., depending upon the frequency of the radar. The duplexer 17 is further connected to a radar transmitter 18 and a radar receiver 19. As is well known in the art, the duplexer 17 is utilized to periodically couple a pulse of energy from the transmitter 18 to an antenna while preventing the energy from being applied to the receiver 19 and, subsequent to the pulse of energy from the transmitter 18, connecting the receiver 19 to the antenna to receive any energy reflected from a target, such as the truck 20 in FIG. 1. In the present embodiment a single transmitter 18 and single receiver 19 are utilized, through the duplexer 17, to alternately energize the antennas 15 and 16. It should be understood, however, that a separate transmitter and receiver might be utilized for each antenna, if desired.

A timing circuit 25 is connected to the transmitter 18 to periodically energize the transmitter 18 and supply a pulse of energy through the duplexer 17 to alternate antennas 15 and 16. The timing circuit 25 also supplies signals to sweep circuits 26 which supplies sweep signals to a cathode ray tube type of indicator 27. The output of the receiver 19 is supplied to one of two video amplifiers 28 or 29. The video amplifier 28 amplifies signals returned from the antenna 15 when a target interrupts the radar beam therefrom and the video amplifier 29 amplifies signals from the antenna 16 when a target interrupts the radar beam emanating therefrom. The receiver 19 may receive timing signals from the timing circuit 25 to separate the two video signals and supply them to the correct video amplifier 28 or 29, as illustrated in FIG. 3, or some other system might be utilized by those skilled in the art.

The video signals from the video amplifiers 28 and 29 are supplied to the input of the indicator 27 to provide a visual indication of the targets on the trace of the indicator 27 produced by the sweep circuits 26. The video signals from each of the amplifiers 28 and 29 should be individually identifiable and, to serve this purpose, the indicator 27 may be a plural color cathode ray tube with the signals from the video amplifier 28 supplied to a red gun and the signals from the video amplifier 29 supplied to a blue gun. Another system for providing individually identifiable visual indications of targets on the indicator 27 is to utilize a cathode ray tube which fluoresces in different colors when struck by electron beams travelling at different speeds. Another method of separating the two video signals by applying them to separate indicators might be utilized, however, this is a less desirable method since the visual indications must then be compared by overlaying one on the other in some fashion.

Whenever a target, such as the truck 20, interrupts one of the beams 12 or 13 a blip or a similar indication appears in the trace on the face of the indicator 27. To make a permanent record of the targets interrupting the beams 12 and 13, the film apparatus, generally designated 35, is mounted in front of the indicator 27. The film apparatus 35 includes a supply of film 36 and a takeup spool 37 driven by a speed controlled drive motor 38. The visual indications on the face of the indicator 27 are focused onto the film by a lens 39. To provide the operator with the individually identifiable indications the film is sensitive to the two colors at the face of the indicator 27. Thus, for example, when the beam 12 is interrupted by the truck 20 a first color blip appears on the face of the indicator 27 and is recorded in the film apparatus 35. Subsequently, when the second beam 13 is interrupted by the truck 20 a second color blip appears on the face of the indicator 27 and is recorded in a second color on the film in the apparatus 35. The distance the truck 20 moved between interruptions, the direction the truck 20 is travelling and the speed of the truck 20 can be determined from the film by the operator in a manner to be described presently.

Figure 2:
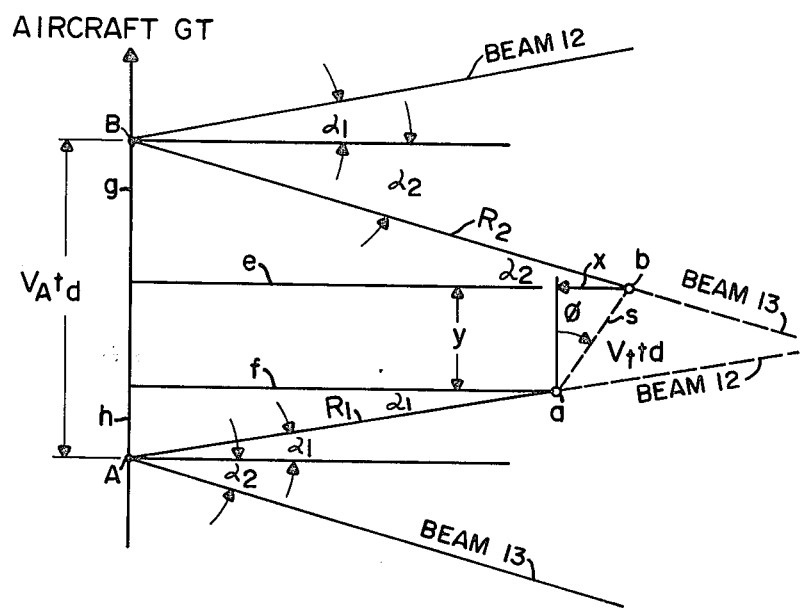
FIG. 2 illustrates geometrically the relationship of the target movement to the aircraft movement.

Referring to FIG. 2, the arrow labeled Aircraft Ground Travel (G.T.) indicates the flight path and distance travelled by the vehicle 10, the point A indicating the position of the vehicle 10 at a first time and the point B indicating the position of the vehicle 10 at some predetermined later time with the distance $V_A t_d$ indicating the distance travelled during the time interval $t_d$. At the point A radar beam 12 is directed outwardly ahead of a line perpendicular to the aircraft G.T. at an angle $\alpha_1$ and the beam 13 is directed behind the line at an angle $\alpha_2$. At the point B beam 12 is directed forward of the perpendicular line at the same angle, $\alpha_1$, and beam 13 is directed rearward of the line at the same angle, $\alpha_2$. Point A is chosen as the position of the vehicle 10 on the aircraft G.T. when the truck 20 interrupts beam 1, the position of the truck 20 at that time being indicated by the point $a$. Point B is chosen as the position of the vehicle 10 on the aircraft G.T. when the truck 20 interrupts the beam 13, the position of the truck at that time being indicated by the point b. During the time that the vehicle 10 travels from point A to point B (a known distance because the speed and time are known) the truck 20 travels from the point $a$ to the point $b$, an unknown distance S or $V_t t_d$ (speed of the truck times the known time). The distance between the point A and the point $a$, designated $R_1$, is the known distance of the truck 20 from the vehicle 10 as measured by the radar beam 12. The distance between the point B and the point $b$, designated $R_2$, is the known distance of the truck 20 from the vehicle 10 as measured by the radar beam 13.

The speed and direction of travel of the truck 20 can be determined from the above information and some preliminary steps will be taken to illustrate the origin and veracity of the equations used. First, a line is drawn parallel to the aircraft G.T. through the point $a$. Then a line is drawn perpendicular to the aircraft G.T. through the point $b$. The distance from the point a to the intersection of the two lines is designated $y$ and the distance from the point $b$ to the intersection of the two lines is designated $x$. The $x$ and $y$ lines are components of the speed of the truck 20 parallel to the aircraft G.T. and perpendicular to the aircraft G.T., respectively. A line is also drawn perpendicular to the aircraft G.T. through the point $a$, which line is designated $f$. The distance from the point A to the intersection of the line $f$ with the aircraft G.T. is designated $h$. The line $x$ is extended to the aircraft G.T. line and the total line from the point $b$ to the aircraft G.T. line is designated $e$ with the portion of the aircraft G.T. line between the junction of the line $e$ and the point being designated $g$. Thus:

$$x = e - f$$
$$e = R_2 \cos \alpha_2$$
$$f = R_1 \cos \alpha_1$$

$$x = R_2 \cos \alpha_2 - R_1 \cos \alpha_1 \quad \alpha_1 = \alpha_2 = 20°$$

$$x = .94 \, (R_2 - R_1)$$

$$y = V_A t_d - g - h$$
$$g = R_2 \sin \alpha_2$$
$$h = R_1 \sin \alpha_1$$

$$y = V_A t_d - R_2 \sin \alpha_2 - R_1 \sin \alpha_1$$

$$y = V_A t_d - .34 \, (R_2 + R_1)$$

$$S^2 = x^2 + y^2$$

$$S = \sqrt{x^2 + y^2}$$

$$S = \sqrt{[.94 \, (R_2 - R_1)]^2 + [V_A t_d - .34 \, (R_2 + R_1)]^2}$$

Since $S$ equals the distance travelled by the truck 20 in the known time, $t_d$, the speed or velocity of the truck can be determined by dividing S by $t_d$. The exact direction of the truck relative to the direction of the vehicle 10 can be determined from the following:

$$\tan \theta = \frac{x}{y}$$

$$\theta = \arctan \frac{x}{y}$$

$$\theta = \arctan \left[ \frac{.94 \, (R_2 - R_1)}{V_A t_d - .34 \, (R_2 + R_1)} \right]$$

It should be noted that all of the above formulas only require the speed of the vehicle 10, the time between interruptions of the beams 12 and 13 by the target and the distances of the target measured by the beams 12 and 13. By manually or automatically placing these four measured figures into a computer preprogrammed for this purpose, the speed and direction of the target can be quickly calculated. As an alternative, the angle between the line S and the aircraft G.T. line can be measured on the film in the apparatus 35 and the length of the line S can be compared to the length of the line between the points A and B to determine the speed of the target relative to the speed of the vehicle 10. Many of these calculations can be simplified with predetermined speeds of the vehicle 10 and angles $\alpha_1$ and $\alpha_2$. However, as additional considerations for choosing the angles $\alpha_1$ and 60 $_2$, the beams 12 and 13 must be spread sufficiently far apart to provide a good indication of the speed and direction of the target but must not be spread so far apart that targets may be missed completely.

Thus, a radar system is disclosed which provides an accurate indication of target speed and direction and which is relatively simple to manufacture and operate. Many different types of apparatus may be devised by those skilled in the art to individually identify targets for the operator of the system and many different methods and apparatus may also be devised for determining the speed and direction of targets from the two visual indications provided by the interruption of the two radar beams by the target. While we have shown and described a specific embodiment of this invention, further modifications and improvements will occur to those skilled in the art. We desire it to be understood therefore, that this invention is not limited to the particular form shown and we intend in the appended claims to cover all modifications which do not depart from the spirit and scope of this invention.

We claim:
1. An aircraft mounted moving target speed and direction determining radar system comprising:
 a. a moving target radar transmitter-receiver means;
 b. antenna means connected to said transmitter-receiver means for providing two radar beams at an angle to each other;
 c. mounting means for affixing said antenna means to such aircraft with the two radar beams directed outwardly to the side of the vehicle relative to the normal direction of movement of the vehicle;
 d. one of said radar beams being directed angularly ahead of a line perpendicular to said normal direction and the second of said two radar beams being directed angularly behind said perpendicular line; and
 e. means for providing individually identifiable visual indications of a target relative to its surrounding interrupting each of said beams to indicate the distance and direction the target has moved between interruptions of the two beams, said visual indications means being connected to said transmitter-receiver means for receiving signals therefrom.

2. A moving target speed and direction determining radar system as claimed in claim 1 wherein the antenna means includes two separate antennas alternately energized by a single transmitter-receiver.

3. A moving target speed and direction determining radar system as claimed in claim 2 wherein the two antennas are directed approximately equiangularly ahead of and behind a line perpendicular to the normal direction of movement of the vehicle.

4. A moving target speed and direction determining radar system as claimed in claim 3 wherein the two antennas are directed approximately 20° ahead of and behind a line perpendicular to the normal direction of movement of the vehicle, respectively.

5. A moving target speed and direction determining radar system as claimed in claim 1 wherein the antenna means provide relatively narrow beams which extend progressively wider in a generally fan shaped configuration as they emanate from the antenna means, said antenna means being mounted by said mounting means for directing the beams so that they are progressively wider spaced from each other as they emanate from the antenna means.

6. A moving target speed and direction determining radar system as claimed in claim 1 wherein the visual indications providing means include a cathode ray tube display, said cathode ray tube being a plural color type and having means associated therewith for providing a first color trace in response to interruptions of one of the radar beams and a second color trace in response to interruptions of the other radar beam.

* * * * *